(12) United States Patent
Cain et al.

(10) Patent No.: US 6,705,127 B1
(45) Date of Patent: Mar. 16, 2004

(54) METHODS OF MANUFACTURING SOOT FOR OPTICAL FIBER PREFORMS AND PREFORMS MADE BY THE METHODS

(75) Inventors: Michael B. Cain, Painted Post, NY (US); Daniel W. Hawtof, Painted Post, NY (US); V. Srikant, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/787,064

(22) PCT Filed: Oct. 18, 1999

(86) PCT No.: PCT/US99/24304

§ 371 (c)(1),
(2), (4) Date: Mar. 12, 2001

(87) PCT Pub. No.: WO00/26151

PCT Pub. Date: May 11, 2000

Related U.S. Application Data
(60) Provisional application No. 60/106,513, filed on Oct. 30, 1998.

(51) Int. Cl.$^7$ ........................... C03B 37/018; G02B 6/18
(52) U.S. Cl. .............................. 65/421; 65/413; 65/414; 423/336; 423/337
(58) Field of Search .................. 65/413, 414, 421; 423/336, 337

(56) References Cited

U.S. PATENT DOCUMENTS 3,883,336 A  5/1975  Randall ........................ 65/18

FOREIGN PATENT DOCUMENTS

| EP | 0 026 625 A2 | 4/1981 | ......... C03B/37/025 |
|---|---|---|---|
| EP | 0 463 783 A1 | 1/1992 | ......... C03B/37/014 |
| EP | 0 535 862 A1 | 4/1993 | ............ G02B/6/16 |
| JP | 56155035 | 1/1981 | ............ C03B/37/00 |
| WO | WO 97/22553 | 6/1997 | ........... C01B/33/12 |
| WO | WO 99/03781 | 1/1999 | ........... C01B/33/18 |
| WO | WO 99/06331 | 2/1999 | ......... C03B/37/014 |

OTHER PUBLICATIONS

Patent Abstracts of Japan—JP56155035, Sumitomo Electric Ind Ltd, Publication Date Dec. 1, 1981.

Patent Abstracts of Japan—JP57183089, NEC Corp, Publication Date Nov. 11, 1982.

*Primary Examiner*—Michael Colaianni
(74) *Attorney, Agent, or Firm*—Robert L. Carlson

(57) ABSTRACT

The present invention is directed to methods of producing soot used in the manufacture of optical waveguides. Both non-aqueous liquid reactants and aqueous solutions containing one or more salts are delivered through an atomizing burner assembly to form a homogenous soot stream containing the oxides of the selected elements contained within the non-aqueous liquid reactant and the aqueous solution. The resulting multi-component soot is collected by conventional methods to form preforms used in the manufacture of optical waveguide fibers. Preforms formed by the methods are also disclosed.

11 Claims, 3 Drawing Sheets

METHODS OF MANUFACTURING SOOT FOR OPTICAL FIBER PREFORMS AND PREFORMS MADE BY THE METHODS

This application claims the benefit of provisional application Ser. No. 60/106,513 filed Oct. 30, 1998.

FIELD OF THE INVENTION

The present invention relates to the formation of soot used in the manufacture of glass and, more particularly, to a method of delivering liquid precursors and other reactants into a flame to create soot for use in the manufacture of optical waveguides, and optical waveguides made by the method.

While the invention is subject to a wide range of glass soot applications, it is particularly well suited for the deposition of soot on a target to form preforms used in the manufacture of optical fibers, and will be particularly described in that connection.

BACKGROUND OF THE INVENTION

Various processes are known in the art that involve the production of oxides, and particularly, metal oxides from vaporous reactants. Such processes require a feedstock solution or precursor, a means of generating and transporting vapors of the feedstock solution (hereafter called vaporous reactants) and an oxidant to a conversion reaction site (also known as a soot reaction zone or combustion zone to those skilled in the art), and a means of catalyzing oxidation and combustion coincidentally to produce finely divided, spherical aggregates, called soot. This soot can be collected in any number of ways, ranging from capture in a collection chamber to deposition on a rotating mandrel. The collected soot may be simultaneously or subsequently heat treated to form a non-porous, transparent, high purity glass article. This process is usually carried out with specialized equipment having a unique arrangement of nozzles, injectors, burners and/or burner assemblies.

Much of the initial research that led to the development of such processes focused on the production of bulk silica. Selection of the appropriate feedstock was an important aspect of that work. Consequently, it was at that time determined that a material capable of generating a vapor pressure of between 200–300 millimeters of mercury (mm Hg) at temperatures below approximately 100° C. would be useful for making such bulk silica. The high vapor pressure of silicon tetrachloride ($SiCl_4$) suggested its usefulness as a convenient vapor source for soot generation and launched the discovery and use of a series of similar chloride-based feedstocks. This factor, more than any other is responsible for the presently accepted use of $SiCl_4$, $GeCl_4$, $POCl_3$, and $BCl_3$ as feedstock vapor sources.

Use of these and other halide-based feedstocks as vapor sources, however, does have its drawbacks. The predominate drawback being the formation of hydrochloric acid (HCl) as a by-product of oxidation. HCl is not only detrimental to the deposition substrates and the reaction equipment, but to the environment as well. Overcoming this drawback, amongst others, led to the use of halide-free compounds as precursors or feedstocks for the production of soot for optical waveguides.

Although use of halide-free silicon compounds as feedstocks for fused silica glass production, as described in U.S. Pat. Nos. 5,043,002 and 5,152,819, for example, avoids the formation of HCl, other problems remain, particularly when the soot is intended for the formation of optical waveguides.

It has been found that, in the course of delivering a vaporized polyalkylsiloxane to the burner, high molecular weight species can be deposited as gels in the lines carrying the vaporous reactants to the burner, or within the burner itself. This leads to a reduction in the deposition rate of the soot that is subsequently consolidated to a blank from which an optical waveguide fiber is drawn. It also leads to imperfections in the blank that often produce defective and/or unusable optical waveguide fiber from the effected portions of the blank. An additional problem encountered while forming silica soot using siloxane feedstocks is the deposition of particulates having high molecular weights and high boiling points on the optical waveguide fiber blank. The build-up of these particulates results in "defect" or "clustered defect" imperfections that adversely affect the optical and structural quality of optical waveguides formed using the silica soot.

Other feedstocks, some of which are, and others of which may be useful in forming soot for the manufacture of optical waveguides are not currently acceptable alterative to the halide-based and halide-free feedstocks for delivery via vapor deposition. Materials such as salts and those known as rare-earth elements, for example, are extremely unstable as vapors and often decompose before they can be delivered in their vapor phase. Rather than being delivered from the burner as a vapor, these elements tend to form solids that plane out of the solution.

Although it is often possible to deliver at least a percentage of these elements to the combustion zone as a vapor, it is technically very difficult. Elaborate systems incorporating expensive equipment are necessary to convert these elements to the vapor phase, and further, to deliver them to the combustion zone without leaving behind deposits of solids in the lines leading to the burners and in the burners themselves. Moreover, if multiple elements are being delivered as vapors and a specific percentage of each is necessary for the desired composition, it is difficult to control the delivery to provide that percentage since different elements have different vapor pressures.

U.S. patent application Ser. No. 08/767,653, discloses that these and other limitations can be overcome by delivering a feedstock to an injector or burner in liquid form, atomizing the feedstock to form an aerosol containing fine droplets of the liquid feedstock, and converting the atomized liquid feedstock into soot at the combustion zone. The injectors, burners, and burner assemblies disclosed in U.S. patent application Ser. No. 08/767,653 rely on very small orifices to deliver the liquid in a fine stream for proper atomization. Because the feedstocks are delivered directly into the burner flame as liquids rather than vapors, the vapor pressures of the feedstocks are no longer limiting factors for delivery. Accordingly, many additional elements can now be delivered as feedstocks or dopants to form soot for use in the manufacture of optical waveguides.

A number of elements however, particularly those which are typically categorized as salts, are not easily delivered to a flame in liquid form as an organometallic compound. The purity requirements are often extremely high, as are the costs associated with attempting to obtain compounds of the required purity.

There is a need therefore, for a method of manufacturing soot for use in making optical waveguides, and particularly preforms for optical waveguide fibers that enables a user to precisely control the quantity of elements being delivered, and at the same time, eliminates gelling in the delivery lines. Further, what is needed is a liquid delivery method that produces glass soot containing metal oxides, traditionally dopants, and salts in the required stoichiometry without requiring expensive and elaborate equipment.

SUMMARY OF THE INVENTION

The present invention is directed to a method for delivering liquids and other reactants to a combustion zone adjacent a burner assembly to produce soot for use in the manufacture of glass. In a liquid delivery system, a liquid reactant, capable of being converted by thermal oxidative decomposition to glass, is provided and introduced directly into the combustion zone of a combustion burner, thereby forming finely divided amorphous soot. Examples of such liquid delivery systems are disclosed in U.S. patent application Ser. No. 08/767,653, filed Dec. 17, 1996, and entitled "Method and Apparatus for Forming Fused Silica by Combustion of Liquid Reactants"; U.S. patent application Ser. No. 08/903,501, filed Jul. 30, 1997, and entitled "Method for Forming Silica by Combustion of Liquid Reactants Using Oxygen"; U.S. patent application Ser. No. 09/089,869, filed Jun. 3, 1998, and entitled "Method and Apparatus for Forming Silica by Combustion of Liquid Reactants Using a Heater"; U.S. Provisional Application Serial No. 60/068,255, filed Dec. 19, 1997, entitled "Burner and Method for Producing Metal Oxide Soot"; and U.S. Provisional Application, filed Jul. 31, 1998, and entitled "Method and Apparatus for Forming Soot for the Manufacture of Glass," the specifications of which are hereby incorporated by reference. The amorphous soot can be captured in any number of ways, but is typically deposited on a receptor surface where, either substanually simultaneously with or subsequent to its deposition, the soot is consolidated into a body of fused glass. The body of glass may then be either used to make products directly from the fused body, or the fused body may be further treated, e.g., by forming an optical waveguide such as by drawing to make optical waveguide fiber as further described in, for example, U.S. patent application Ser. No. 08/574,961 entitled, "Method for Purifying polyalkylsiloxane and the Resulting Products", the specification of which is hereby incorporated by reference.

The method of the present invention provides a number of advantages over other glass soot production methods known in the art. The present invention provides the capability of precisely varying and controlling the composition of the soot produced, which in turn provides for optical waveguide fibers having well defined and highly accurate index profiles, and other characteristics. The present invention further affords the industry with a method of concurrently delivering the greatest number of elements to a flame, to produce a multi-component glass soot. Any of a number of the organometallics, the rare earth elements, and now salts can all be concurrently delivered to a flame to produce homogenous soot. Similarly, these elements can be concurrently, or selectively delivered during the same soot production run to produce a preform meeting specific layering requirements. Accordingly, an optical fiber preform made by the method of the present invention has the advantage of containing precise quantities of elements, some of which have never been combined within a single optical waveguide fiber preform.

To achieve these and other advantages, a non-aqueous liquid reactant and an aqueous solution are atomized to form an aerosol made up of numerous liquid droplets. The aerosol is delivered into a combustion zone and reacted in the flame of the combustion zone to form finely divided glass soot particles.

In another aspect of the invention, a non-aqueous liquid reactant and an aqueous solution are delivered to a burner assembly. The non-aqueous liquid reactant and the aqueous solution are discharged from the burner assembly into a flame where they are reacted to form soot. The soot is deposited onto a target to form a preform.

In yet another aspect of the invention, an optical fiber preform is formed by the process of delivering a non-aqueous liquid reactant and an aqueous solution to a burner assembly. The non-aqueous liquid reactant and the aqueous solution are discharged from the burner assembly into a flame as an aerosol formed of a plurality of non-aqueous liquid reactant droplets and a plurality of liquid aqueous solution droplets. The droplets are reacted in the flame to produce soot and the soot is deposited on a target to form the preform.

In a further aspect of the invention, the delivery of an aqueous solution is combined with conventional vapor delivery. The aqueous solution is atomized with a gas at a burner assembly to form an aerosol made up of numerous liquid droplets, and another reactant is vaporized for delivery to the burner assembly. The vaporous reactant and the aerosol are reacted in a combustion zone adjacent the burner assembly to form finely divided glass soot.

Additional features and advantages of the invention will be set forth in the detailed description, which follows, and in part will be apparent from the description, or may be learned by practice of the invention. It will be understood by those skilled in the art that both the foregoing general description and the following detailed description are exemplary and explanatory in nature and are intended to provide further explanation of the invention as claimed.

The accompanying drawings are included to provide a further understanding of the invention, and are incorporated in and constitute a part of this specification. The drawings illustrate several embodiments of the invention, and together with the description serve to explain the principles of the invention.

DETAILED DESCRIPTION OF THE PREFERRED EMBODIMENTS

A number of soot collection and soot deposition techniques are employed in the manufacture of glass products. While the present invention is capable of being employed in a number of these techniques, it is particularly well suited for those techniques used to deposit soot on a target to form glass preforms used in the manufacture of optical waveguides, and specifically optical waveguide fibers. It will be understood by those skilled in the art, however, that the method of the present invention can be used in the manufacture of planar waveguides as well.

During the manufacture of optical waveguide fibers, soot typically is uniformly deposited on or within a target. The collected soot is consolidated into a high purity glass preform and thereafter subjected to further processing steps such as drawing to form a thin fiber capable for carrying and directing light. Accordingly, the present invention will be described in this regard. It will be understood by those skilled in the optical waveguide fiber art, however, that there are other systems and variations of the depicted systems in which the present invention can be incorporated to perform the functions described and claimed herein. Reference will now be made in detail to the present preferred embodiments of the invention, examples of which are schematically illustrated in the accompanying drawings.

Figure 1:
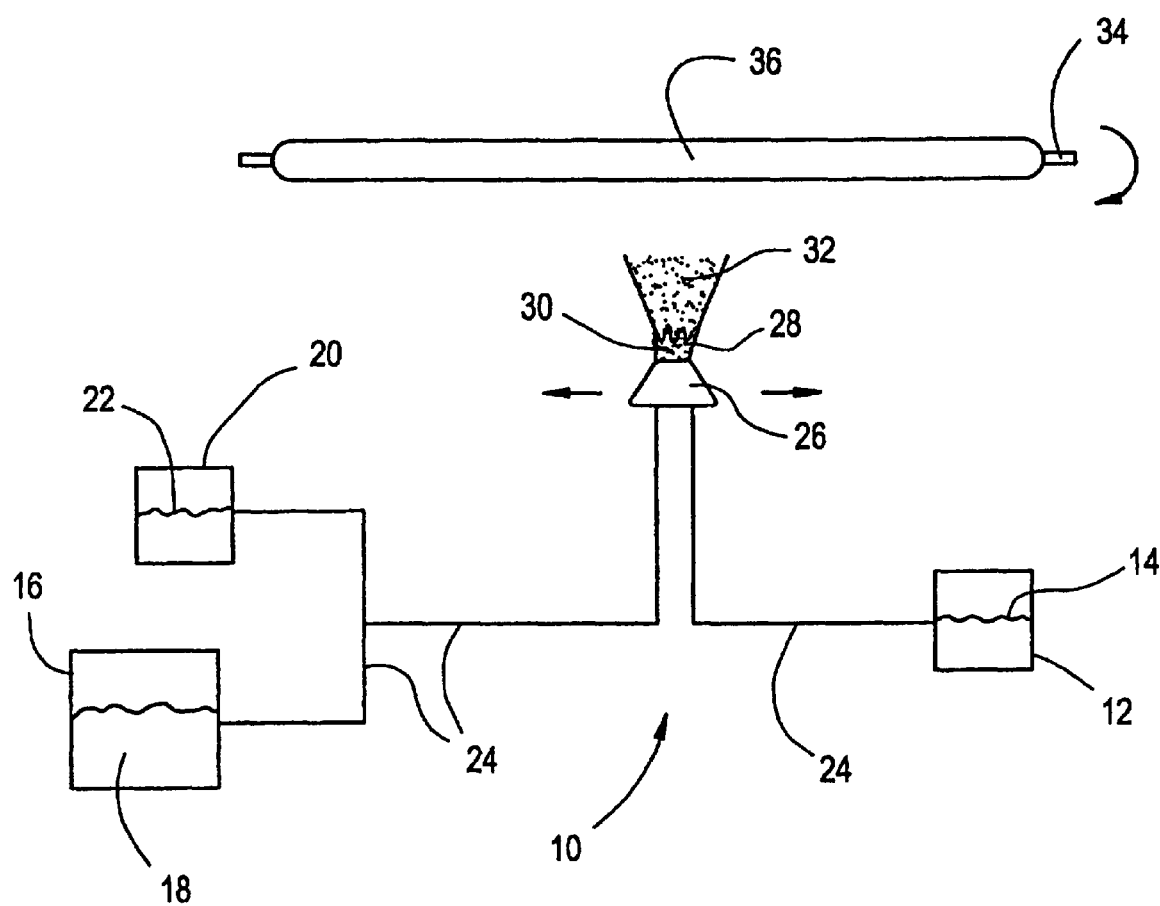
FIG. 1 schematically depicts a first preferred embodiment of a liquid delivery system used in the method of the present invention.

A first preferred embodiment of the system for delivering liquids into a combustion zone to form multi-component soots for use in the manufacture of glass is schematically depicted in FIG. 1. Liquid delivery system 10 includes an aqueous solution reservoir 12 containing aqueous solution 14, a non-aqueous liquid reactant reservoir 16 containing a non-aqueous liquid reactant 18, and optionally, a dopant reservoir 20 containing a dopant 22. In addition, liquid delivery system 10 includes an atomizing burner assembly 26 such as an atomizing burner assembly and the associated delivery mechanisms (hereinafter, "burner assembly") disclosed in U.S. patent application Ser. No. 08/767,653, filed Dec. 17, 1996, and entitled "Method and Apparatus for Forming Fused Silica by Combustion of Liquid Reactants"; U.S. patent application Ser. No. 08/903,501, filed Jul. 30, 1997, and entitled "Method for Forming Silica by Combustion of Liquid Reactants Using Oxygen"; U.S. patent application Ser. No. 09/089,869, filed Jun. 3, 1998, and entitled "Method and Apparatus for Forming Silica by Combustion of Liquid Reactants Using a Heater"; U.S. Provisional Application Serial No. 60/068,255, filed Dec. 19, 1997, entitled "Burner and Method for Producing Metal Oxide Soot"; and U.S. Provisional Application, filed Jul. 31, 1998, and entitled "Method and Apparatus for Forming Soot for the Manufacture of Glass", the specifications of which are hereby incorporated by reference.

In operation, aqueous solution 14, non-aqueous liquid reactant 18, and dopant 22 are mixed according to the desired stoichiometry and stored within their respective reservoirs 12, 16, and 20. Aqueous solution 14 preferably contains a water soluble salt such as an alkali metal nitrate, alkali metal carbonate, alkali metal sulfate, alkali metal acetate, alkaline earth metal nitrate, alkaline earth metal carbonate, alkaline earth metal sulfate, or alkaline earth metal acetate. More specifically, aqueous solution 14 contains one or more water soluble salts such as barium nitrate, barium acetate, barium chloride, strontium nitrate, strontium acetate, strontium chloride, antimony nitrate, antimony acetate, lead nitrate, lead carbonate, lead sulfate, lead acetate, lanthanum nitrate, lanthanum carbonate, lanthanum sulfate, lanthanum acetate, cobalt nitrate, cobalt acetate, cobalt chloride, neodymium nitrate, neodymium praeseodymium chloride, potassium nitrate, potassium chloride, nitrate, cesium nitrate, cesium chloride, cesium sulfate, cesium hydroxide, calcium chloride aluminum nitrate, sodium nitrate, sodium chloride, erbium chloride, and erbium sulfate, but can contain other salts and/or other elements capable of being mixed in and delivered as an aqueous solution.

Non-aqueous liquid reactant 18 is preferably a liquid organometallic compound such as octamethylcyclotetrasiloxane, but can be a silicon alkoxide, a metal alkoxide, or other siliceous matrix material made soluble with a suitable organic solvent, such as ethylene glycol monomethylether. Dopant 22, if used, can be ketonates, alkoxides, acetates, β-diketonates, or fluoro-β-diketonates of praeseodymium, holmium, and thulium dissolved in a suitable organic solvent such as ethylene glycol monomethylether. Typically, the preferred dopants 22 are erbium, germanium, and other rare earth elements having properties beneficial for use in optical waveguide fibers.

Aqueous solution 14, non-aqueous liquid reactant 18, and if desired, dopant 22 are delivered via liquid delivery lines 24 to burner assembly 26 in the desired quantities. Liquids 14, 18, and 22 are discharged from burner assembly 26 into flame 28 as atomized liquid droplets 30. Liquid droplets 30 are uniformly mixed in the atomization process and are reacted in the flame 28 to produce a soot stream 32. Soot stream 32 is preferably directed toward a target, such as rotating mandrel 34 as burner assembly 26 traverses along the length of rotating mandrel 34, resulting in the deposition of soot on rotating mandrel 34, which in turn forms a homogenous soot body 36 containing the desired quantities of oxides of the elements contained in aqueous solution 14, non-aqueous liquid reactant 18, and dopant 22.

Figure 2:
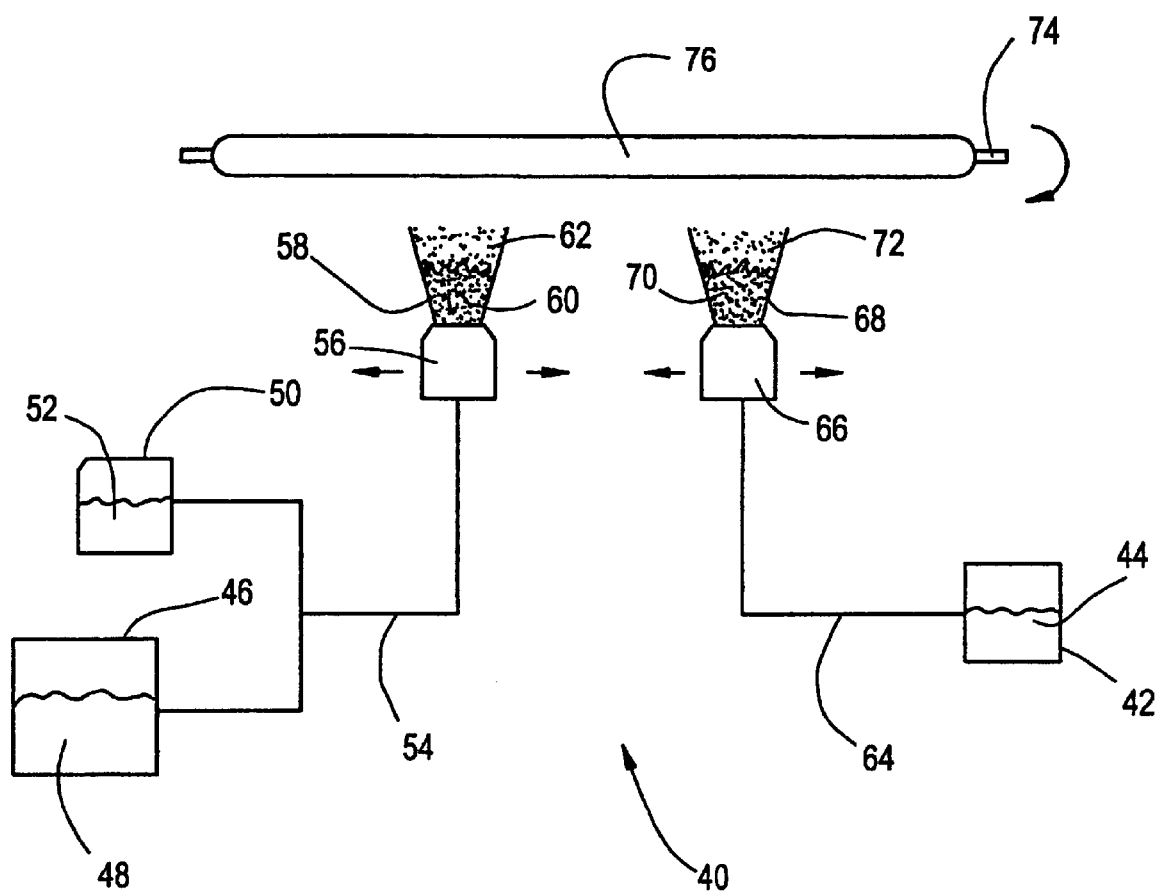
FIG. 2 schematically depicts a second preferred embodiment of a liquid delivery system used in the method of the present invention.

A second preferred embodiment of the system for delivering liquids into a combustion zone to form multi-component soots for use in the manufacture of glass is schematically depicted in FIG. 2. Like the first preferred embodiment, liquid delivery system 40 includes an aqueous solution reservoir 42 for storing aqueous solution 44, a non-aqueous liquid reactant reservoir 46 for storing a non-aqueous liquid reactant 48, and optionally, a dopant reservoir 50 for storing a dopant 52. However, unlike the first preferred embodiment of the invention, liquid delivery system 40 includes a first burner assembly 56 in selective fluid communication with non-aqueous liquid reactant reservoir 46 and dopant reservoir 50, and a second burner assembly 66 in fluid communication with aqueous solution reservoir 42. As described below, it will be understood by those skilled in the art that aqueous solution 44 and non-aqueous liquid reactant 48 can include one or more of the compounds described above with respect to the first preferred embodiment of the present invention.

In operation, aqueous solution 44 is selectively delivered to second burner assembly 66 and non-aqueous liquid reactant 48, and dopant 52, if desired, are selectively delivered to first burner assembly 56. First burner assembly 56 discharges atomized liquid droplets 60 into a flame 58 where the liquid droplets 60 are combusted to form a soot stream 62 containing a homogeneous mixture of oxides produced from the oxidization of the selected elements contained within non-aqueous liquid reactant 48 and dopant 52. Second burner assembly 66 can be activated concurrently with or independently of first burner assembly 56 to discharge atomized liquid droplets 70 into a flame 68 to form a homogeneous soot stream 72 containing oxides of the element resulting from the oxidation of elements contained in aqueous solution 44. Soot stream 62 and 72 are preferably directed toward a target such as rotating mandrel 74, and soot from the soot streams 62 and 72 is deposited on rotating mandrel 74 in uniform layers as first burner assembly 56 and second burner assembly 66 traverse along the length of rotating mandrel 74. The resulting soot body 76 contains all of the oxides from soot streams 62 and 72 according to the rate at which they are delivered.

The multiple burner assemblies of this embodiment of the present invention generally facilitate a greater soot deposition rate than the first embodiment of the present invention. In addition, the spaced arrangement of the burner assemblies 56 and 66 enable the soot to be deposited in discrete layers which provides a controlled and cost effective way of making an optical waveguide having well defined index profiles and other optical characteristics.

Figure 3:
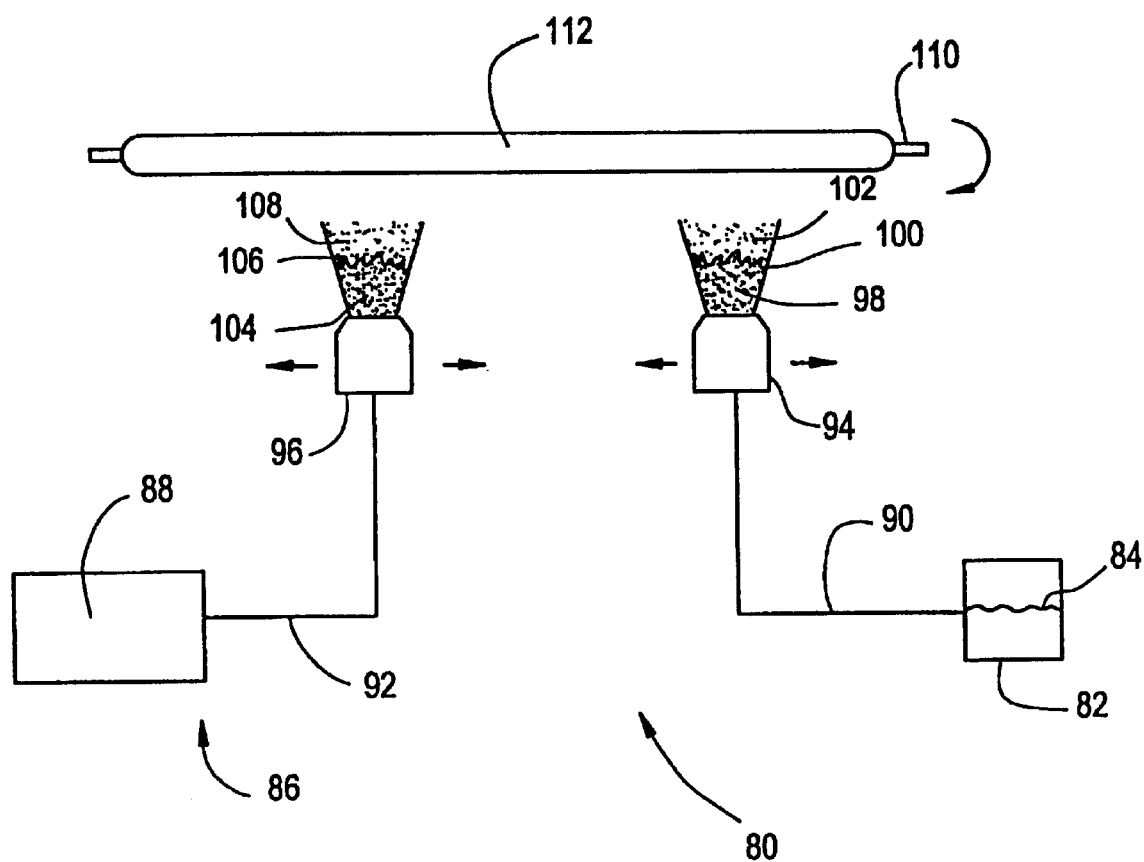
FIG. 3 schematically depicts a preferred embodiment of a combined vapor and liquid delivery system used in the method of the present invention.

FIG. 3 schematically depicts a preferred embodiment of a combined vapor and liquid delivery system 80 used in practicing the method of the present invention. The combined vapor and liquid delivery system 80 includes an aqueous solution reservoir 82 for storing aqueous solution 84 and a liquid delivery line 90 for placing a first burner assembly 94 in communication with aqueous solution 84. In addition, combined vapor and liquid delivery system 80 includes a vapor delivery system 86 for delivering a vaporous reactant 88 through liquid delivery line 92 to a second burner assembly 96. Vapor delivery system 86 can be any vapor delivery system known in the art such as, but not limited to, vapor delivery systems disclosed in U.S. Pat. Nos. 5,043,002, and 3,698,936, the specifications of which are hereby incorporated by reference. Vaporized reactant 88 is preferably a halide-based feedstock such as, but not limited to, $SiCl_4$, or a halide-free based feedstock such as, but not limited to, octamethylcyclotetrasiloxane. Aqueous solution 14 preferably contains a water soluble salt such as an alkali metal nitrate, alkali metal carbonate, alkali metal sulfate, alkali metal acetate, alkaline earth metal nitrate, alkaline earth metal carbonate, alkaline earth metal sulfate, or an alkaline earth metal acetate. More specifically, aqueous solution 84 contains one or more water soluble salts such as barium nitrate, barium acetate, barium chloride, strontium nitrate, strontium acetate, strontium chloride, antimony nitrate, antimony acetate, lead nitrate, lead carbonate, lead sulfate, lead acetate, lanthanum nitrate, lanthanum carbonate, lanthanum sulfate, lanthanum acetate, cobalt nitrate, cobalt acetate, cobalt chloride, neodymium nitrate, neodymium chloride, potassium nitrate, potassium chloride, praeseodymium nitrate, cesium nitrate, cesium chloride, cesium sulfate, cesium hydroxide, calcium chloride, aluminum nitrate, sodium nitrate, sodium chloride, erbium chloride, and erbium sulfate, but can contain other salts and/or other elements capable of being mixed in and delivered as an aqueous solution.

In operation, aqueous solution 84 is selectively delivered to burner assembly 94, and vaporized reactant 88 is delivered to second burner assembly 96. Aqueous solution 84 is atomized with a gas such as air, but preferably oxygen, or oxygen together with an inert gas such as nitrogen, at first burner assembly 94 to form an aerosol formed of a plurality of liquid droplets ranging generally in size from about 10 microns to 200 microns. The majority of droplets will typically be about 20 microns in size. Atomized liquid droplets 98 are discharged into a first flame 100 formed adjacent first burner assembly 94 where atomized liquid droplets 98 are combusted to form a first soot stream 102 containing a homogenous mixture of oxides produced from the oxidation of the selected elements contained within aqueous solution 84. Vaporous reactant 88 is delivered through vapor delivery line 92 and second burner assembly 96 as vapors 104 which are discharged into second flame 106 formed adjacent second burner assembly 96. Vapors 104 are combusted in second flame 106 to form a second soot stream 108 containing a homogenous mixture of oxides produced from the oxidation of the selected elements contained within vaporous reactant 88. First and second soot streams 102, 108, respectively, are directed toward a target, such as rotating mandrel 110, and the soot within soot streams 102 and 108 is deposited on rotating mandrel 110 in uniform layers as first burner assembly 94 and second burner assembly 96 traverse along the length of rotating mandrel 110. The resulting soot body 112 contains all the oxides from first and second soot streams 102 and 108, respectively, according to the rate at which they are delivered.

Although not shown in FIG. 3, an additional burner assembly and associated delivery mechanisms can be incorporated into the system shown in FIG. 3 to deliver additional dopants commonly used in the manufacture of soot for optical waveguide fibers. This embodiment of the present invention combines the higher soot deposition rate of vapor deposition with the unique optical characteristics provided by salts delivered in an aqueous solution. It will be understood by those skilled in the art that vaporous reactant 88 and aqueous solution 84 can be delivered into a common flame to produce a homogenous soot stream which can be collected in any manner commonly known in the art and thereafter further processed to form optical waveguides, and particularly preforms for optical waveguide fibers.

Although not shown in the drawing figures, it will be understood by those skilled in the art that the systems schematically depicted in FIGS. 1, 2 and 3, are not limited to the number of burner assemblies and associated delivery mechanisms shown in the drawings. Each system can incorporate additional burner assemblies and associated delivery mechanisms to practice the methods of the present invention. Generally speaking, the greater the number of burner assemblies, the greater the soot deposition rate. Moreover, the present invention can be used in conjunction with other vapor delivery systems commonly known in the art to provide even greater flexibility in the manufacture of soot for optical waveguide fibers.

It will be apparent to those skilled in the art that various modifications and variations can be made in the methods of manufacturing soot for optical fiber preforms of the present invention without departing from the spirit or scope of the invention. Thus, it is intended that the present invention cover the modifications and variations of this invention provided they come within the scope of the appended claims and their equivalents. In addition, the corresponding structures, materials, acts and equivalents of all means or step plus function elements in the claims below are intended to include any structure, material, or acts for performing the function in combination with other claimed elements as specifically claimed herein.

We claim:

1. A method of making soot from which an optical fiber preform is made, said method comprising the steps of:

a) atomizing a non-aqueous liquid reactant and an aqueous solution to form an aerosol comprising numerous liquid droplets, b) delivering said aerosol into a combustion zone; and c) reacting said aerosol in a flame provided at said combustion zone to form finely divided glass soot particles, wherein said non-aqueous liquid reactant and said aqueous solution are delivered to a single burner assembly prior to atomizing said non-aqueous liquid reactant and said aqueous solution.

2. The method as claimed in claim 1 wherein said non-aqueous liquid reactant comprises a non-aqueous solution.

3. The method as claimed in claim 1 wherein said non-aqueous liquid reactant comprises at least one precursor and at least one dopant.

4. The method as claimed in claim 1 wherein said non-aqueous liquid reactant comprises a siloxane, and wherein said aqueous solution comprises a salt.

5. The method as claimed in claim 4 wherein said salt is selected from the group consisting of alkali metal nitrate, alkali metal carbonate, alkali metal sulfate, alkali metal acetate, alkaline earth metal nitrate, alkaline earth metal carbonate, alkaline earth metal sulfate, alkaline earth metal acetate, barium nitrate, barium acetate, barium chloride, strontium nitrate, strontium acetate, strontium chloride, antimony nitrate, antimony acetate, lead nitrate, lead carbonate, lead sulfate, lead acetate, lanthanum nitrate, lanthanum carbonate, lanthanum sulfate, lanthanum acetate, cobalt nitrate, cobalt acetate, cobalt chloride, neodymium nitrate, neodymium chloride, potassium nitrate, potassium chloride, praeseodymium nitrate, cesium nitrate, cesium chloride, cesium sulfate, cesium hydroxide, calcium nitrate, calcium chloride, aluminum nitrate, sodium nitrate, sodium chloride, erbium chloride, and erbium sulfate.

6. The method as claimed in claim 5 wherein said non-aqueous liquid reactant further comprises a dopant.

7. A process for making an optical fiber preform, said process comprising the steps of:
   a) delivering a non-aqueous liquid reactant and an aqueous solution to a burner assembly;
   b) discharging said non-aqueous liquid reactant and said aqueous solution from said burner assembly into a flame, herein said non-aqueous liquid reactant and said aqueous solution are atomized to form an aerosol comprising a plurality of non-aqueous liquid reactant droplets mixed with a plurality of liquid aqueous solution droplets;
   c) reacting said non-aqueous liquid reactant and said aqueous solution in said flame to produce soot; and
   d) depositing said soot onto a rotating mandrel.

8. The process of claim 7 wherein the step of atomizing occurs as said non-aqueous liquid reactant and said aqueous solution are discharged from said burner assembly.

9. The process as claimed in claim 7 wherein said non-aqueous liquid reactant comprises at least one precursor and at least one dopant.

10. The method as claimed in claim 7 wherein said non-aqueous liquid reactant comprises a siloxane, and wherein said aqueous solution comprises a salt.

11. The method as claimed in claim 10 wherein said salt is selected from the group consisting of alkali metal nitrate, alkali metal carbonate, alkali metal sulfate, alkali metal acetate, alkaline earth metal nitrate, alkaline earth metal carbonate, alkaline earth metal sulfate, alkaline earth metal acetate, barium nitrate, barium acetate, barium chloride, strontium nitrate, strontium acetate, strontium chloride, antimony nitrate, antimony acetate, lead nitrate, lead carbonate, lead sulfate, lead acetate, lanthanum nitrate, lanthanum carbonate, lanthanum sulfate, lanthanum acetate, cobalt nitrate, cobalt acetate, cobalt chloride, neodymium nitrate, neodymium chloride, potassium nitrate, potassium chloride, praeseodymium nitrate, cesium nitrate, cesium chloride, cesium sulfate, cesium hydroxide, calcium nitrate, calcium chloride, aluminum nitrate, sodium nitrate, sodium chloride, erbium chloride, and erbium sulfate.

\* \* \* \* \*